United States Patent Office 3,166,520
Patented Jan. 19, 1965

3,166,520
PROCESS FOR PRODUCING BORON-NITROGEN POLYMERS FROM BORAZOLES
William David English, Garden Grove, and Harry Goldsmith, Long Beach, Calif., assignors to United States Borax & Chemical Corporation, Los Angeles, Calif., a corporation of Nevada
No Drawing. Filed June 19, 1961, Ser. No. 117,834
8 Claims. (Cl. 260—2)

This invention relates as indicated to boron-nitrogen polymers and has more particular reference to the preparation of thermally stable polymers by the copolymerization of substituted borazoles.

The class of materials known as borazoles are heterocyclic hexatomic ring compounds having the general formula $(XBNY)_3$, and any substituents, X and Y, on the ring are named with "B" and "N" prefixes to designate their positions.

It is the principal object of the present invention to provide a method for the preparation of polymeric materials by the copolymerization of substituted borazoles.

It is a further object of this invention to provide new boron-nitrogen polymers having high thermal stability.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises the method of producing thermally stable polymers which comprises heating two different substituted borazoles in a closed system at a temperature of from about 350° C. to about 600° C., said borazoles having the formula:

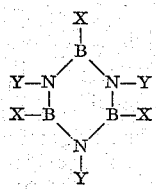

where X is a radical selected from the class consisting of hydrogen, alkyls, unsubstituted aromatics, substituted aromatics containing alkyl substituents, unsubstituted heterocyclic aromatics, substituted heterocyclic aromatics containing alkyl substituents, and secondary aminos, and Y is a radical selected from the class consisting of hydrogen, alkyls, unsubstituted aromatics, substituted aromatics containing alkyl substituents, unsubstituted heterocyclic aromatics and substituted heterocyclic aromatics containing alkyl substituents.

It will be noted that the present invention comprises the formation of polymeric materials by the copolymerization of two different substituted borazoles; and further, it will be noted that to obtain the desired polymers the substituted borazoles must be heated together at a temperature of from about 350° C. to about 600° C. in a closed system. We have found that copolymerization will not take place at temperatures below about 350° C. and at such temperatures the borazoles have a vapor pressure which would cause them to volatilize. By using a closed system volatilizing before copolymerization is prevented. It is to be understood that, if desired, additional pressure can be applied to the reaction, however, from an economic and practical standpoint this is unnecessary as long as the substituted borazoles are heated together in a closed system.

It is of further interest to note that it is the intent of the present invention to exclude the presence of any unsaturated aliphatic hydrocarbon substituents on either of the borazole molecules. When unsaturated hydrocarbon substituents are present on either of the borazoles polymerization will take place between the double bonds of the unsaturated hydrocarbon radical before copolymerization of the borazoles can take place and will interfere with the copolymerization reaction.

Thus, it is important to the present invention that only such radicals as defined in the above broadly stated paragraph can be substituted on the boron and nitrogen atoms of the borazole molecules. The substitutions on the boron and nitrogen atoms, of the individual borazoles may all be the same or they can be mixed.

It will be noted here that the homopolymerization of individual substituted borazoles will take place under the same conditions as set forth in the present invention. However, copolymerization of different borazole molecules, that is, two borazoles which differ in at least one of the substituents on their respective molecules, has many advantages, copolymerization rates are much more rapid, the yield of product and the varieties of polymers are greatly increased and since the chemical composition of the polymeric materials are quite different the copolymers have many different properties than the homopolymers. The homopolymers are generally infusible and insoluble solids of limited value while many of the copolymers are soluble in organic solvents and are thermosetting resins which will find many valuable commercial applications.

The prime requisite for copolymerization is that two different borazoles are used. It has also been discovered that when two differently substituted borazoles are present in about a 1:1 molar ratio and when one of the borazoles has hydrogen as the substituent on its nitrogen atoms, the highest yields of product are obtained.

While any two substituted borazoles substituted with any of the previously defined radicals on the boron and/or nitrogen atoms are capable of producing polymers having high thermal stability, we have found that a particular group within this class of radicals bonded to the borazole molecules will produce polymers having the greatest thermal stability. Thus in the preferred embodiment of the invention we copolymerize substituted borazoles having hydrogen, methyl, phenyl, methyl substituted phenyl, xenyl, methyl substituted xenyl and dimethyl-sym-triazinyl groups bonded to the boron and/or nitrogen atoms of the borazole molecules. Polymeric materials produced from substituted borazoles having these latter mentioned substituents will be found thermally stable at temperatures of about 600° C. Polymeric materials produced from substituted borazoles having substituents other than the latter mentioned group of substituents will be found to be thermally stable in a temperature range of from about 350° C. to about 450° C.

It is our theory that the substituted borazoles form borazole-linked chain polymers with a certain degree of cross-linking, and in order for this type of copolymerization to take place the borazoles must be heated to a sufficiently high temperature under pressure. However, regardless of whether our theory is correct, the fact remains that it is possible to produce thermally stable polymeric materials by the copolymerization of two different substituted borazoles.

Referring now to the many substituted borazoles which are applicable to the present invention and which are capable of undergoing copolymerization. The following list is illustrative of the substituted borazoles containing the same substituents on all of the boron and nitrogen atoms:

Hexamethylborazole
Hexaethylborazole
Hexa-n-propylborazole
Hexaisopropylborazole
Hexa-n-butylborazole
Hexa-sec-butylborazole
Hexa-n-amylborazole
Hexa-n-hexylborazole
Hexa-n-dodecylborazole
Hexaisooctadecylborazole
Hexaphenylborazole
Hexa(p-biphenyl)borazole
Hexa-(4-methylphenyl)borazole
Hexakis-(dimethyl-sym-triazinyl)borazole As previously stated, the substituents on the borazole molecules can be intermixed. The following are a few examples of such borazoles:

B-trimethylborazole
B-triphenylborazole
N-trimethylborazole
B-triphenyl-N-trimethylborazole
B-tris-(dimethyl-sym-triazinyl)-N-triisopropylborazole
B-triethyl-N-triphenylborazole
B-tri-n-hexyl-N-tri-n-butylborazole
B-tris-(p-biphenyl)-N-triethylborazole
B-tri-α-naphthyl-N-triethylborazole The following list is illustrative of substituted borazoles wherein the previously defined secondary amino radicals are substituted on the boron atom, and, as stated previously, in this instance the nitrogen atoms can not have hydrogen as a substituent but must contain one of the previously defined hydrocarbon substituents:

B-tris-(diphenylamino)borazole
B-tris-(dimethylamino)borazole
B-tris-(dimethylamino)-N-trimethylborazole
B-tris-(diethylamino)-N-triphenylborazole
B-tris-(diisopropylamino)-N-triethylborazole
B-tris-(diethylamino)-N-tri-n-butylborazole It is to be clearly understood that the foregoing lists are only a partial enumeration of the substituted borazoles applicable to the present invention. The enumerated borazoles are given for the purpose of illustrating the previously defined substituted borazoles and are not intended to limit the invention.

So that the present invention can be more clearly understood, the following illustrative examples are given:

I

B-triphenylborazole, 0.62 grams (0.002 mole) and hexamethylborazole, 0.33 grams (0.002 mole), were placed in a necked-down test tube which was then chilled in liquid nitrogen, evacuated and sealed. The sealed tube was then heated for about 48 hours at from 350° C. to 390° C., after which time the tube was cooled, chilled in liquid nitrogen and opened. The opened tube was placed into a sublimation apparatus and the unreacted borazoles were removed and recovered. The residue left in the tube was a clear, hard, yellow resin.

The clear, hard, yellow resin melted at between 190° C. to 210° C., was insoluble in water and was soluble in most of the common organic solvents. When heated in a sealed tube the molten polymer became cloudy at 250° C. and at 280° C., it set to a solid white resin. No visible change in the white resin was noted when it was heated to 570° C.

II

B-triphenylborazole, 4.63 grams (0.015 mole), and B-triphenyl-N-trimethylborazole, 5.26 grams (0.015 mole), were placed in a necked-down test tube which was then chilled in liquid nitrogen, evacuated and sealed. The sealed tube was then heated for about 48 hours at from about 350° C. to 390° C., after which time the tube was cooled, chilled in liquid nitrogen and opened. The opened tube was placed into a sublimation apparatus and the unreacted borazoles were removed and recovered. The residue left in the tube was a clear, hard, yellow resin.

The clear, hard, yellow resin melted at between 158° C. and 170° C. to a clear yellow liquid. The resin was insoluble in water and was soluble in most of the common organic solvents. When heated in a sealed tube the molten polymer began to darken at about 500° C. and set to a clear amber solid at about 530° C. There was no visible change in the amber solid when heated to 600° C.

III

B-triphenyl-N-trimethylborazole, 7.0 grams (0.02 mole), and hexamethylborazole, 3.3 grams (0.02 mole), were placed in a necked-down test tube which was then chilled in liquid nitrogen, evacuated and sealed. The sealed tube was then heated for about 48 hours at about 390° C., after which time the tube was cooled, chilled in liquid nitrogen and opened. The opened tube was placed into a sublimation apparatus and the unreacted borazoles were removed and recovered. The residue left in the tube was a hard yellow glass.

The hard yellow resin melted at between 110° C. and 120° C., was insoluble in water and was soluble in most of the common organic solvents. When heated in a sealed tube the molten polymer began to darken at about 400° C. and at 600° C. was a clear amber liquid which set to a solid on cooling.

IV

B-triphenylborazole, 238 grams (0.77 mole) and B-triphenyl-N-trimethylborazole, 270 grams (0.77 mole), were admixed and placed in a one liter stainless steel Parr bomb. The Parr bomb was flushed with nitrogen several times and was then evacuated. The bomb was then heated to about 375° C. and the pressure inside the bomb reached about 350 p.s.i.g. after about 40 hours. The reaction mass was allowed to cool to about 225° C. and was then poured into a sublimation apparatus where the unreacted borazoles were removed and recovered. The residue left in the sublimation apparatus was a yellow-green glassy solid polymer.

The yellow-green glassy solid resin melted at between 162° C. and 175° C. to a clear yellow liquid. It was insoluble in water, but was soluble in most of the common organic solvents. When heated in a closed system the molten polymer set to a clear amber solid at 535° C. No visible change was noted in the amber solid when it was heated to over 600° C.

As can be seen, Example IV is a repetition of Example II on a much larger scale.

V

B-triphenylborazole, 7.10 grams (0.023 mole) and N-trimethylborazole, 2.82 grams (0.023 mole) were placed in a necked-down test tube which was then chilled in liquid nitrogen, evacuated and sealed. The sealed tube was then heated for about 17 hours at about 395° C. after which time the tube was cooled, chilled in liquid nitrogen and opened. The opened tube was placed into a sublimation apparatus and the unreacted borazoles were removed and recovered. The residue left in the tube was a solid, infusible, and insoluble yellow polymeric material which showed no visible change in characteristics when heated to 500° C.

The foregoing examples illustrate the copolymerization of only a few of the various substituted borazoles. Due to the fact that any of the previously defined substituted borazoles will undergo copolymerization in the same manner, it appears unnecessarily repetitious to present other examples illustrating the present method and techniques for preparing other polymeric materials using these substituted borazoles.

As noted throughout the present specification the polymers produced by the present invention are stable at high temperatures. These materials will be found to have utility as molding and casting resins and for the production of a wide variety of articles to be used in high temperature environments. The present polymers can be fused or can be applied to other surfaces as a film from solution or in a molten state for use as a protective coating. Furthermore, by controlling the degree of copolymerization, or by the choice of starting materials, the product can be recovered as a thermally stable polymeric liquid.

Other modes of applying the principle of the invention may be employed, change being made as regards the details described, provided the features stated in any of the following claims or the equivalent of such be employed.

We, therefore, particularly point out and distinctly claim as our invention:

1. The method of producing thermally stable polymers which consist essentially of heating two different substituted borazoles in a closed system at a temperature of from about 350° C. to about 600° C., wherein one of the borazole reactants has at least one substituent bonded thereto which is not present as a substituent on the other borazole reactant, said borazoles having the formula

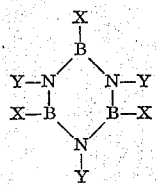

where X is selected from the class consisting of hydrogen, alkyl of from 1 to 12 carbon atoms, phenyl, alkyl substituted phenyl containing alkyl substituents of from 1 to 12 carbon atoms, xenyl, alkyl substituted xenyl containing alkyl substituents of from 1 to 12 carbon atoms, naphthyl and secondary amino groups, and Y is selected from the class consisting of hydrogen, alkyl of from 1 to 12 carbon atoms, phenyl, alkyl substituted phenyl containing alkyl substituents of from 1 to 12 carbon atoms, xenyl, alkyl substituted xenyl containing alkyl substituents of from 1 to 12 carbon atoms, and naphthyl.

2. The method of claim 1 which comprises heating said borazole reactants in about equimolar amounts.

3. The method of claim 1 wherein one of said borazole reactants contains unsubstituted nitrogen atoms.

4. The method of producing thermally stable polymers which comprises heating about equimolar amounts of two different substituted borazoles in a closed system at a temperature of from about 350° C. to about 600° C., wherein one of the borazole reactants has at least one substituent bonded thereto which is not present as a substituent on the other borazole reactant, said substituted borazoles having the formula:

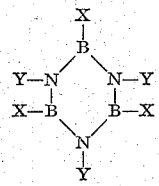

where X and Y are radicals selected from the group consisting of hydrogen, methyl, phenyl, methyl substituted phenyl, xenyl, methyl substituted xenyl, and dimethyl-sym-triazinyl.

5. The method of producing thermally stable polymers which comprises heating equimolar amounts of B-triphenylborazole and hexamethylborazole in a closed system at a temperature of from about 350° C. to about 600° C.

6. The method of producing thermally stable polymers which comprises heating equimolar amounts of B-triphenylborazole and B-triphenyl-N-trimethylborazole in a closed system at a temperature of from about 350° C. to about 600° C.

7. The method of producing thermally stable polymers which comprises heating equimolar amounts of hexamethylborazole and B-triphenyl-N-trimethylborazole in a closed system at a temperature of from about 350° C. to about 600° C.

8. The method of producing thermally stable polymers which comprises heating equimolar amounts of B-triphenylborazole and N-trimethylborazole in a closed system at a temperature of from about 350° C. to about 600° C.

References Cited in the file of this patent
UNITED STATES PATENTS

| | | |
|---|---|---|
| 2,917,543 | Smalley et al. | Dec. 15, 1959 |
| 2,954,402 | Stafiej et al. | Sept. 27, 1960 |
| 3,052,641 | McCloskey et al. | Sept. 4, 1962 |